United States Patent
Dijkstra

(12) 
(10) Patent No.: US 6,338,135 B1
(45) Date of Patent: Jan. 8, 2002

(54) DATA PROCESSING SYSTEM AND METHOD FOR PERFORMING AN ARITHMETIC OPERATION ON A PLURALITY OF SIGNED DATA VALUES

(75) Inventor: Wilco Dijkstra, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/196,214

(22) Filed: Nov. 20, 1998

(51) Int. Cl.[7] .............................................. G06F 9/302
(52) U.S. Cl. ........................ 712/221; 712/222; 712/208
(58) Field of Search ................. 712/222, 221, 712/210, 9, 4, 208; 708/497

(56) References Cited

U.S. PATENT DOCUMENTS

| | | | | |
|---|---|---|---|---|
| 5,748,516 A | * | 5/1998 | Goddard et al. | 708/497 |
| 5,761,469 A | * | 6/1998 | Greenley | 712/210 |
| 5,931,943 A | * | 8/1999 | Orup | 712/222 |
| 5,978,901 A | * | 11/1999 | Luedtke et al. | 712/222 |
| 6,047,372 A | * | 4/2000 | Thayer et al. | 712/222 |
| 6,098,162 A | * | 8/2000 | Schiffleger et al. | 712/4 |
| 6,202,141 B1 | * | 3/2001 | Diefendorff et al. | 712/9 |

FOREIGN PATENT DOCUMENTS

| | | |
|---|---|---|
| EP | 0 395 348 | 10/1990 |
| EP | 0 602 888 | 6/1994 |
| EP | 0 682 317 | 11/1995 |
| GB | 2 321 547 | 7/1998 |
| WO | WO 95/17712 | 6/1995 |

OTHER PUBLICATIONS

Zucker et al, "Achieving Subword Parallelism by Software Reuse of the Floating Point Data Path" Proceedings of the SPIE, XP000648205, pp. 51–55.

* cited by examiner

*Primary Examiner*—Zarni Maung
*Assistant Examiner*—Jungwon Chang
(74) *Attorney, Agent, or Firm*—Nixon & Vanderhye P.C.

(57) ABSTRACT

Disclosed is a data processing system and a method for performing an arithmetic operation on a plurality of signed data values. In the data processing system and the method, there is a first step in which two or more signed data values are encoded into a composite value and an arithmetic operation is applied to the composite value to produce an encoded result. The encoded result can then be decoded to produce final results where each final result represents the application of the arithmetic operation to a corresponding signed data value. Thus, by using the encoded composite value, a single arithmetic operation can be applied simultaneously to multiple data values and the result then decoded. The decoded result represents the result of applying the arithmetic operation to each data value separately. The advantage of this operation is that operations can be formed on multiple data values without requiring the provision of dedicated hardware or new instructions as required by the prior art.

17 Claims, 4 Drawing Sheets

DATA PROCESSING SYSTEM AND METHOD FOR PERFORMING AN ARITHMETIC OPERATION ON A PLURALITY OF SIGNED DATA VALUES

FIELD OF THE INVENTION

The present invention relates to a data processing system and method for performing an arithmetic operation on a plurality of signed data values, and in particular to techniques which avoid the requirement to apply the arithmetic operation individually to each signed data value.

DESCRIPTION OF THE PRIOR ART

To enable arithmetic operations to be applied simultaneously to a number of data values. Single Instruction Multiple Data (SIMD) instructions have been developed, where a single instruction is applied to a composite data value consisting of a number of fields, with each field containing a separate data value.

To support SIMD instructions, it is necessary to provide specific SIMD hardware to ensure that the data values in each field of the composite data value do not interact with each other during the application of the SIMD operation to the composite data value. For example, SIMD extensions like Intel Corporation's MMX hardware and the SA-1500 coprocessor generally allow a wide register to be split into independent fixed size sub-fields. For example, such registers may be 64 bits wide, and hence may contain eight 8-bit values, four 16-bit values or two 32-bit values. SIMD instructions operating on these registers are usually 3-operand instructions of the type A=B top C, but they operate on each of the sub-fields in parallel.

For example, an addition of two 64-bit SIMD registers containing four 16-bit values results in four additions being performed on the four sub-fields of each register. The 64-bit result contains four 16-bit values which are the sum of the corresponding fields of the inputs.

The SIMD approach is especially useful in cases where a set of operations on data, for example 8 to 16-bit data, must be performed many times on large quantities of data. Considering the example where 64-bit registers are used, by employing SIMD instructions, up to eight independent 8-bit data sets can be processed in parallel, achieving significant processing speed improvements. One particular area where such SIMD instructions are useful is the area of IPEG or MPEG compression and/or decompression, where many Discrete Cosine Transformation (DCT) operations need to be performed. Each DCT consists of a series of additions and multiplications performed on signed data, and it has been found that the use of SIMD instructions can significantly improve processing speed.

However, there are a number of disadvantages resulting from the use of SIMD instructions. Firstly, as mentioned earlier, to enable SIMD instructions to operate correctly, special hardware is required to ensure that the data values in the various subfields of the register remain decoupled from each other as the SIMD operation is applied. Further, new SIMD instructions that use this hardware need to be defined. This tends to lead to an increase in the instruction bit space required to identify instructions, which is undesirable.

SUMMARY OF THE INVENTION

Viewed from a first aspect, the present invention provides a method of operating a data processing system to perform an arithmetic operation on a plurality 'p' of signed 'n-bit' data values, comprising the steps of encoding the plurality of signed n-bit data values as a composite value comprising p n-bit fields by performing an encoding operation equivalent to aligning each signed data value with a respective n-bit field, sign extending each signal data value to the most significant bit of the composite value, and adding the aligned and sign extended data values to form the composite value; applying the arithmetic operation to the composite valve to produce an encoded result comprising a n-bit fields; and decoding the encoded result to produce p final results by applying a decoding operation equivalent to extracting the data from each n-bit field of the encoded result and correcting for any effect caused by the addition of an adjacent sign extended data value during the encoding step; whereby each final result represents the application of the arithmetic operation to a corresponding signed n-bit data value.

In accordance with the present invention, two or more signed data values are encoded into a composite value, and the composite value is then processed using standard instructions as if they were SIMD instructions. This is made possible by use of a particular encoding of the signed data values which avoids the problems with overflow and underflow between two adjacent data values. Since this encoding enables standard instructions to be used, much of the benefits of using SIMD extensions can be achieved without the cost of extra hardware or now instructions which SIMD techniques necessitate.

In accordance with the present invention, a plurality p of signed n-bit data values are encoded as a composite value comprising p n-bit fields by performing an encoding operation equivalent to aligning each signed data value with a respective n-bit field, sign extending each signed data value to the most significant bit of the composite value, and adding the aligned and sign extended data values to form the composite value. This encoding allows many operations, for example addition, subtraction, multiplication by a constant and left shifting operations, to be used as long as each of the packed values remains within the minimum/maximum range (for example a value in a 16-bit field must remain within the range −32768 to +32767).

In accordance with the present invention, the encoding is applied to signed data values. Since the encoding of the present invention involves applying an operation equivalent to sign extending each signed data value to the most significant bit of the composite value, it is clear that the addition of the various signed data values aligned with their respective n-bit fields of the composite value will potentially result in some interaction between the various data values. For example, in preferred embodiments, by sign extending a particular signed data value, there will be no effect on the other data values if that sign extended data value is positive, but if that sign extended data value is negative, then this will have the effect of subtracting from the composite value the value 1 aligned with the adjacent data value representing the next n higher significant bits of the composite value.

Accordingly, due to this potential interaction, it is entirely counter intuitive to apply this encoding, since it would be expected that the application of the arithmetic operation to the composite value resulting from such encoding would no yield a result from which could be derived the individual results that would of arisen from the application of the arithmetic operation to each signed n-bit data value in turn. However, contrary to expectations, it has been found that by using the encoding technique of the present invention, the application of the arithmetic operation does yield an encoded result from which the individual final results can be readily derived. All that is required is to extract the data from each n-bit field of the encoded result and to correct for any effect caused by the addition of an adjacent sign extended data value during the encoding step. Hence, in preferred embodiment, all that is required is to add back to the encoded result the value 1 aligned with a particular n-bit field of the encoded result, if the data in the adjacent n-bit field representing the adjacent n lower significant bits of the encoded result is negative.

It will be appreciated that there are many different ways in which the encoding operation can be implemented, provided that the implementation chosen yields a composite value which is equivalent to aligning each signal data value with a respective n-bit field, sign extending each signed data value to the most significant but of the composite value, and adding the aligned and signed extended data values to form the composite value. For example, it is not necessary to align each signed data value with a respective n-bit field prior to sign extending each signed data value, and alternatively each signed data value can first be sign extended prior to any alignment process taking place.

Further, in one embodiment of the present invention, the encoding operation comprises the steps of allocating said plurality of n-bit data values to respective n-bit fields of an intermediate value, where the first n-bit field comprises the n lowest significant bits of the intermediate value and the p-th n-bit field comprises the n highest significant bits of the intermediate value; for the p-1-th to the first n-bit field, beginning with the p-1-th n-bit field, determining whether the data value in that n-bit field is negative, and if so, generating a new intermediate value by subtracting from the intermediate value a logic 1 value aligned with the adjacent n-bit field representing a higher significant bits; such that when the first n-bit field has been processed, said intermediate value is said composite value.

Similarly, it will be appreciated that the decoding operation can be implemented in a number of different ways, provided that it produces final results that are equivalent to extracting the data from each n-bit field of the encoded result and correcting for any effect caused by the addition of an adjacent sign extended data value during the encoding step. For example, in a preferred embodiment of the present invention, a first n-bit field of the encoded result comprises the n lowest significant bits of the encoded result and a p-th n-bit field of the encoded result comprises the n highest significant bits of the encoded result, and the decoding operation comprises the steps of: for the first n-bit field to the p-1-th n-bit field, starting with the first n-bit field, determining if the data in that n-bit field is negative, and if so, generating a new encoded result by adding to the encoded result a logic 1 value aligned with the adjacent n-bit field representing a higher significant bits; such that when the p-1-th n-bit field has been processed, each n-bit field contains one of said p final results.

Whilst considering the encoding operation and the decoding operation, it will also be appreciated by those skilled in the art that, dependent on the implementation chosen, the encoding operation and/or the decoding operation can consist of one or more instructions.

In preferred embodiments, the arithmetic operation is a function of one or more composite values, each composite value encoding a plurality of signed n-bit data values, and each composite value being generated by applying said encoding step to the corresponding plurality of signed n-bit data values. Hence, if it is desired to perform the addition $A=A_1+A_2$ and the addition $B=B_1+B_2$, then, in accordance with preferred embodiments of the invention, two composite values $C_1$ and $C_2$ would be produced, where $C_1$ is an encoding of $A_1$ and $B_1$ and $C_2$ is an encoding $A_2$ and $B_2$, and the arithmetic operation would then perform an addition of the two composite values $C_1$ and $C_2$ to produce the result $C=C_1+C_2$. The results A and B would then be derived by decoding the result C of the arithmetic operation. The above operation is illustrated for simplicity, but it will be appreciated by those skilled in the art that more than two data values may be involved in the generation of a composite value, and the arithmetic operation may be applied to more than two composite values. Further, it will be appreciated that the arithmetic operation may in fact comprise a plurality of operations.

In preferred embodiments, the signed data values are in 2-s complement format.

It will be appreciated that many different arithmetic operations may be applied to the composite values resulting from the encoding technique of the present invention. However, in one embodiment of the present invention, the arithmetic operation comprises one or more discrete cosine transformation (DCT) operations, each DCT operation being a function of one or more composite values, each composite value encoding a plurality of signed n-bit data values, and each composite value being generated by applying said encoding step to the corresponding plurality of signed n-bit data values. One particular area where DCT operations are applied is that of JPEG of MPEG compression or decompressions, and it has been found that the techniques in accordance with preferred embodiments of the present invention are particularly advantageous when performing JPEG or MPEG compression or decompression.

Viewed from a second aspect, the present invention provides a data processing system for performing an arithmetic operation on a plurality 'p' of signed 'n-bit' data values, comprising: a processor for applying the arithmetic operation; a storage for storing the plurality of signed n-bit data values; the processor being arranged, prior to execution of the arithmetic operation, to retrieve the plurality of signed n-bit data values from the storage, and to encode the plurality of signed n-bit data values as a composite value comprising p n-bit fields by executing an encoding operation equivalent to aligning each signed data value with a respective n-bit field, sign extending each signed data value to the most significant bit of composite value, and adding the aligned and sign extended data values to form the composite value, the composite value being stored in the storage, the processor being arranged to apply the arithmetic operation to the composite value to produce an encoded result comprising p n-bit fields, and to store the encoded result in the storage, and the processor further being arranged, subsequent to application of the arithmetic operation, to decode the encoded result to produce p final results by executing a decoding operation equivalent to extracting the data from each n-bit field of the encoded result and correcting for any effect caused by the addition of an adjacent sign extended data value during the encoding step; whereby each final result represents the application of the arithmetic operation to a corresponding signed n-bit data value.

In preferred embodiments, the processor includes a shifter and an arithmetic logic unit (ALU) arranged to execute the encoding and decoding operations. These are standard hardware elements within a typical processor, and hence no special hardware is required within the processor to enable it to handle the encoding and decoding operations. However, if desired, specific hardware could be provided to handle the encoding and or the decoding operations.

The storage used to store the signed n-bit data values, the composite value, and the encoded result, may take a variety of forms, for example a memory, or a register bank, and indeed different physical storage elements may be used to store the signed n-bit data values, the composite value, and the encoded result. However, in preferred embodiments, the storage is a register bank for storing data values used by the processor. Hence, prior to execution of the encoding operation, the relevant signed n-bit data values will be read into the register bank from memory, and then the encoding operation, arithmetic operation and decoding operation will take place by appropriate manipulation of the data values in the register bank.

Viewed from a third aspect, the present invention provides an encoding/decoding manager for a data processing system arranged to perform an arithmetic operation on a plurality 'p' of signed 'n-bit' data values, the encoding/decoding manager being arranged to encode the plurality of signed 'n-bit' data values as a composite value prior to application of the arithmetic operation by the data processing system to generate an encoded result, and to subsequently decode the encoded result to produce p final results, the encoding/decoding manager comprising: an encoder configured in operation to encode the plurality of signed n-bit data values as said composite value comprising p n-bit fields by performing an encoding operation equivalent to aligning each signed data value with a respective n-bit field, sign extending each signed data value to the most significant bit of the composite value, and adding the aligned and sign extended data values to form the composite value, and a decoder configured in operation to produce said p final results by applying a decoding operation equivalent to extracting the data from each n-bit field of the encoded result and correcting for any effect caused by the addition of an adjacent sign extended data value during the encoding step: whereby each final result represents the application of the arithmetic operation to a corresponding signed n-bit data value.

Viewed from a fourth aspect, the present invention provides a computer program product on a computer readable memory for operating a data processing system to encode a plurality 'p' of signed 'n-bit' data values as a composite value prior to application of an arithmetic operation to generate an encoded result, and to subsequently decode the encoded result to produce p final results, the computer program product comprising: an encoder configured in operation to encode the plurality of signed n-bit data values of said composite value comprising p n-bit fields by performing an encoding operation equivalent to aligning each signed data value with a respective n-bit field, sign extending each signed data value to the most significant bit of the composite value, and adding the aligned and sign extended data values to form the composite value; and a decoder configured in operation to produce said p final results by applying a decoding operation equivalent to extracting the data from each n-bit field of the encoded result and correcting for any effect caused by the addition of an adjacent sign extended data value during the encoding step, whereby each final result represents the application of the arithmetic operation to a corresponding signed n-bit data value.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
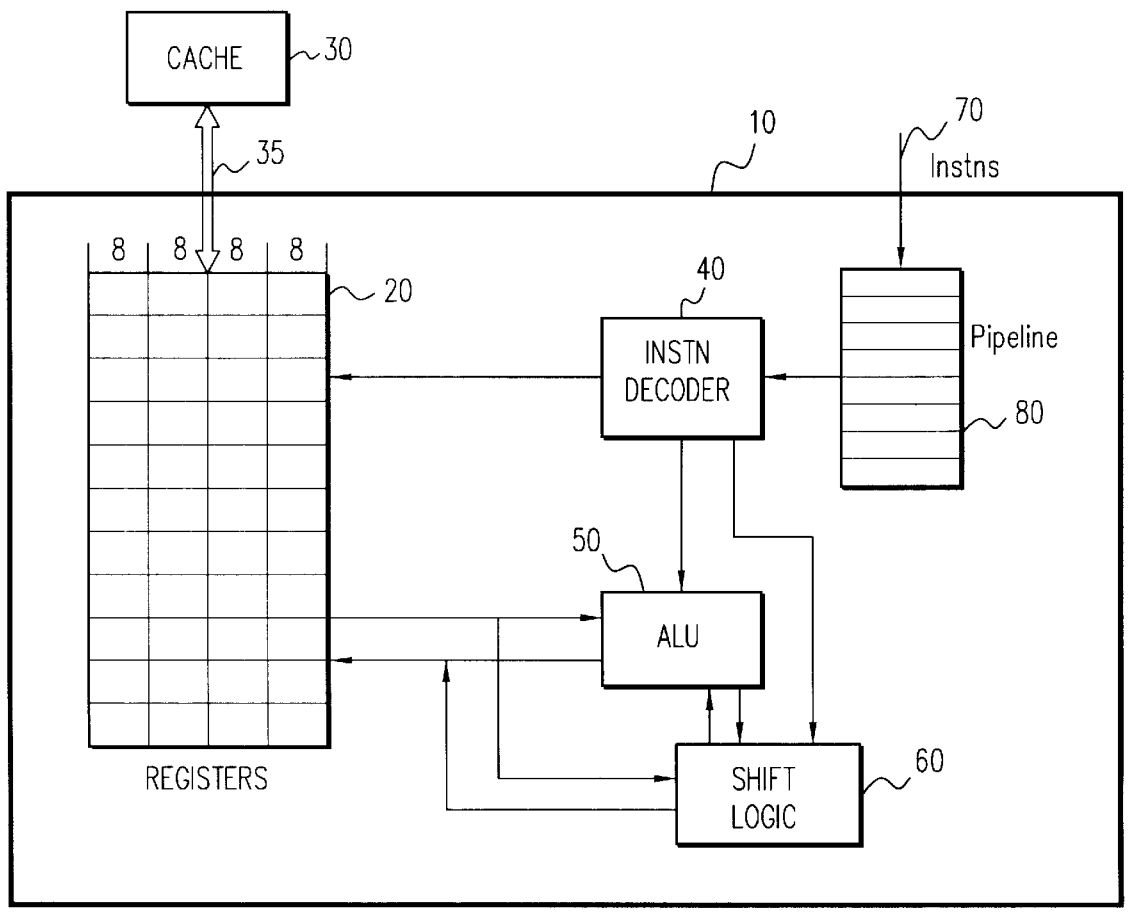
FIG. 1 is a block diagram illustrating elements of a processor core used in an embodiment of the present invention to perform the encoding and decoding operations.

FIG. 1 is a block diagram illustrating components of a standard processor core 10 arranged in accordance with a preferred embodiment of the present invention to perform an arithmetic operation on a plurality p of signed n-bit data values. Instructions to be executed by the core 10 are passed over path 70 into an instruction pipeline 80. Further, data values to be used by the processor core are loaded into a register bank 20, typically comprising a plurality of registers. In FIG. 1, the data values are loaded into the register 20 from a cache 30 over path 35, but will be appreciated that the data values need not be loaded directly from cache 30, but could alternatively be loaded from other memory provided by the data processing system containing the processor core 10.

In FIG. 1, the register 20 is illustrated as having a plurality of registers, each register being 32 bits in length, and consisting of four 3-bit fields. However, the registers need not be 32 bits in length, and other typical register sizes that may be used are 64 bits and 128 bits.

An instruction decoder 40 is arranged to read instructions from the pipeline 80, and to decoder those instructions into operations to be applied by hardware within the processor core. Accordingly, as an example, if the instruction decoder 40 decoders an instruction requiring a shift operation to be performed, it will provide a signal to shift logic 60 to instruct the shift logic to perform the necessary shift operation. Further, it will send a signal to the register back 20 to cause the operand data value(s) to be output from the register bank to the shift logic 60. Typically, once the operand data value has been shifted, the shifted value will be returned by the shift logic 60 to the register bank 20, where it will be stored in one of the registers.

Similarly, if the instruction decoder 40 decodes an arithmetic operation such as a multiplication or an addition, it will send a signal to the Arithmetic Logic Unit (ALU) 50 to cause the ALU to perform the necessary arithmetic operation (s). Further, it will contact the register bank 20 to cause the necessary operand data values to be passed from the register bank 20 to the ALU 50, and on completion of the arithmetic operation(s), the ALU 50 will typically store the resultant data value(s) back to the register bank 20.

The above discussion of FIG. 1 is intended to provide an overview of the operation of the illustrated standard elements of a processor core 10. In accordance with preferred embodiments of the present invention, this standard core 10 is arranged to perform an arithmetic operation on a plurality of signed n-bit data values, and the techniques used to achieve this in preferred embodiments will now be discussed in more detail with reference to FIGS. 2 to 4.

The techniques of the preferred embodiment are applied to signed data values in 2-s complement format, these being data values which have a sign bit which allows the value to be positive or negative. Hence, considering the example o a signed 8-bit data value, this may range in value from −128 to +127.

In accordance with an encoding technique employed in a first embodiment of the present invention, the signed data values are "sign extended". Considering the example of a 16-bit data value, this can be sign extended to, for example, a 32-bit data value by placing 16 copies of the sign bit (e.g., bit 15 considering the example of a 16-bit data value) in bits 16 to 31. Hence, for example, the 16-bit signed value −32767 is 0x8001 in hexadecimal notation, the symbol "0x" identifying that the notation is hexadecimal. By sign extending this number to 32-bits, it becomes 0XFFFFF80001, since the hexademical value "S" indicates that the four most significant bits of the 16-bit value are "1000" in binary format, and accordingly the sign bit is "1".

In accordance with preferred embodiments of the present invention, the plurality of signed n-bit data values are encoded prior to application of the arithmetic operation. The encoding technique used in a first embodiment of the present invention will be discussed further with reference to FIG. 2. At step 200, the plurality of n-bit data values are leaded from the cache 30 into predetermined registers of the register bank 20. Then, at step 210, each signed data value is sign extended to "m" bits, where m is the length of the composite value that is to be used to encoded the plurality of n-bit data values. The sign extension process maybe performed by the ALU 50 or the shift logic 60. Preferably, these sign extended data values are then stored in "m" bit registers of the register bank.

At step 220, a first n-bit data value is allocated as the n least significant bits of the composite value. Then, at step 230, a variable X is set equal to 1, and at step 240 the next sign extended n-bit data value is retrieved from the its register in the register bank 20 by the shift logic 60, and is shifted left by Xn bits. Preferably, at this stage, the data value as shifted is written back to a selected register of the register bank 20.

Following this step, the process proceeds to step 250, where it is determined whether the value Xn equals m. This calculation effectively determines whether all of the n-bit data values to be encoded into the composite value have been shifted so as to align them with their respective n-bit field of the composite value. If X does not equal m, then the process proceeds to step 260, where X is incremented by 1, and the process then returns to step 240. Taking this new incremented value of X, and next n-bit data value is then shifted left by Xn bits, and this process is repeated for each n-bit value in turn until it is determined that Xn equals m. At this stage, all of then-bit data values will have been sign extended to m bits, and will have been shifted so as to be aligned with a respective n-bit field of the composite value. Accordingly, at step 270, these sign extended and shifted data values are retrieved by the ALU 50 from the register bank 20, and added together to form the composite value. The result is then output to the register bank 20 for storage in a register allocated to hold the composite value. At this point, the encoding operation is complete, and so the process proceeds to step 280 where the encoding operation is terminated.

Figure 2:
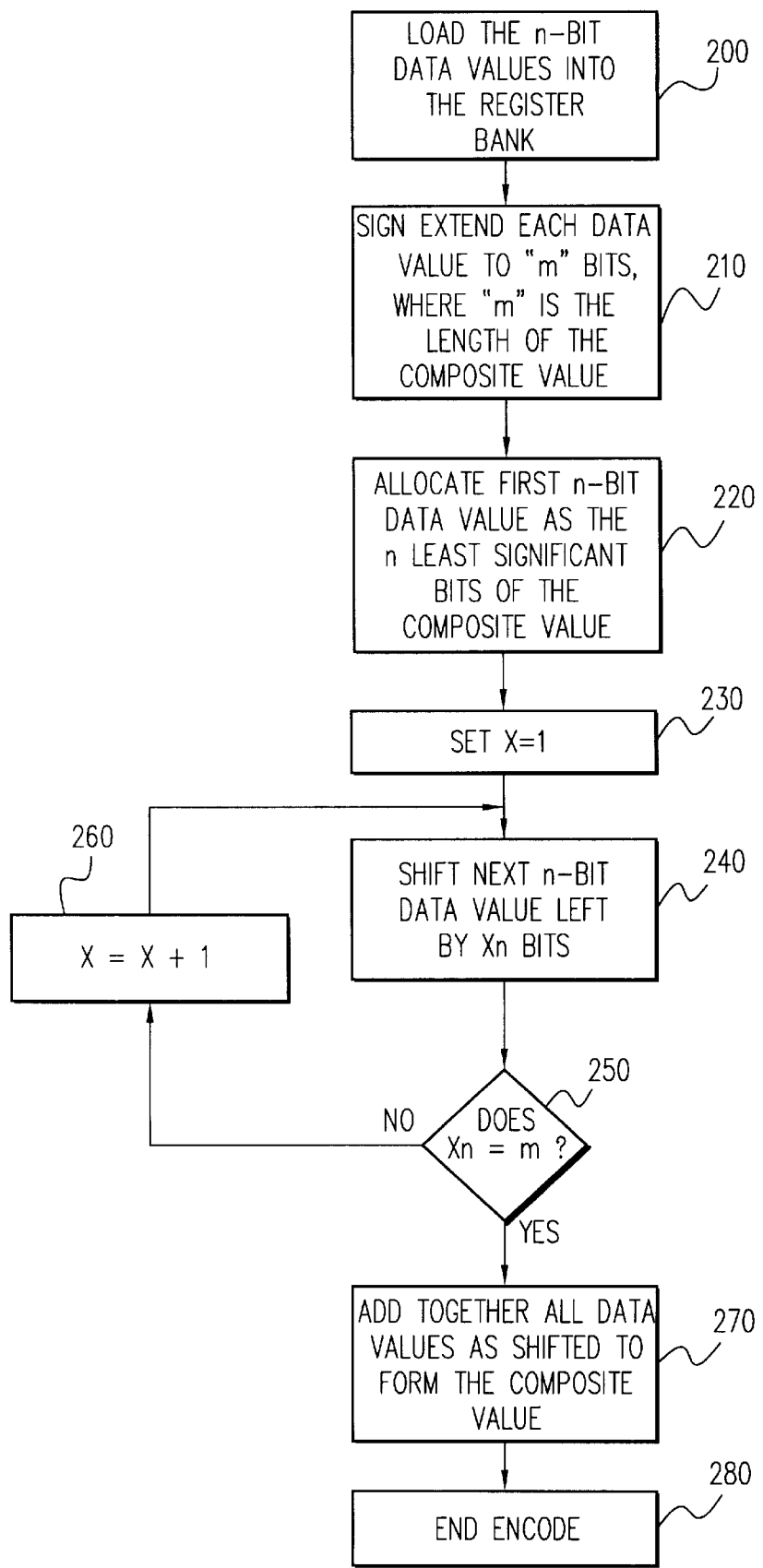
FIG. 2 is a flow diagram illustrating the encoding operation in accordance with a first embodiment of the present invention.

It will be appreciated by those skilled in the art that the sequence of operations need not be performed in exactly the same order as that illustrated in FIG. 2. For example, the shifting process embodied by steps 220 to 260 in order to align each n-bit data value with a respective n-bit field of the register allocated for the composite value can be performed prior to any sign extension of the data values. In this case, once all of the data values have been aligned with their respective n-bit field, then each data value is sign extended to the most significant bit of the composite value (i.e. for a composite value having length m, and consisting of bits 0 to m-1, then each data value will be sign extended to bit m-1). Following the sign extension operation, then the process will proceed to step 270, where the values are added together.

Further, raher than leaving the addition step until the end, it is possible to perform an addition each time a data value is sign extended and shifted. For example, when the second data value is shifted left by n bits and sign extended, it can then be added directly to the first sign extended data value, prior to sign extending and shifting the third data value. Then, when the third data value has been sign extended and shifted left by 2n bits, then that value can be added to the result of the previous addition, and so on, until all n-bit data values have been encoded into the composite value.

To further illustrate the encoding technique described with reference to FIG. 2, an example will now be considered, where two 16-bit values a and b are to be encoded into a 32-bit word c. The encoding can be represented by the equation:

$$c = \text{SignExtend}(a) + (b < 21\ 16)$$

Accordingly, a is first sign extended to 32 bits, and then b is added into the high 16 bits of the sign extended version of a. In preferred embodiments, if a is a positive number, then the sign bit (i.e. bit 15) will be 0, and hence the sign extension will involve adding 0s into bits 16 to 31. Accordingly, this process will have no effect on the value of b represented in the upper 16 bits of c. However, if a is negative, then the sign bit will be 1, and accordingly 1s will be added to bits 16 to 31. This means that if a is negative, b is effectively decremented by 1 when encoded in c. For example, if a =−2 and b=10, then c=−2+(10<<16) which equals 0x0009FFFE. Hence, it is seen that the low 16 bits still represents −2, but the high 16 bits represents +9, instead of the expected +10.

Figure 3:
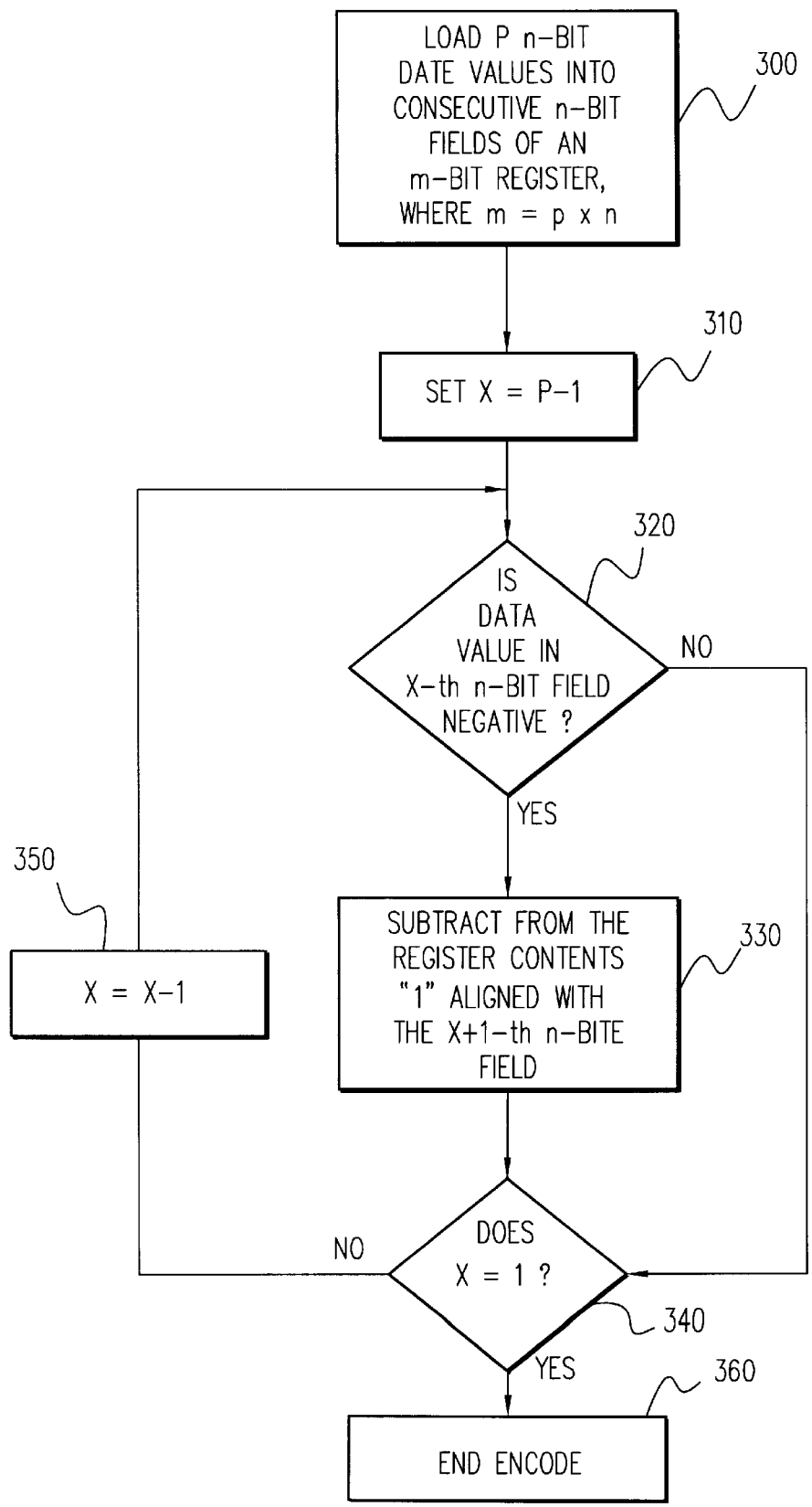
FIG. 3 is a flow diagram illustrating the encoding operation in accordance with a second embodiment of the present invention.

It will be appreciated that the encoding process performed does not actually have to perform the sign extending and shifting functions directly, as long as the encoding produces a composite value equivalent to the process illustrated with reference to FIG. 2. For example, an alternative encoding technique which results in the same composite value is illustrated in FIG. 3. In accordance with the FIG. 3 process, the p n-bit data values to be encoded into the composite value are first loaded into consecutive n-bit fields of an m-bit register allocated for the composite value, where m=p×n. Hence, if the composite value is to represent four 8-bit data values, the m=32, and the composite value will be stored in a 32-bit register. At this stage, the data values will be packed as they would be when using the prior art SIMD approach, in that each data value is placed in a respective n-bit field of the register, and none of the data values overlap each other.

However, in accordance with the encoding technique of this embodiment, the process then proceeds to step 310, where a variable X is set equal to p-1. Then, at step 320 it is determined whether the data value in the X-th n-bit field negative. Thus, considering the above example where the four 8-bit data values are encoded into the composite value, then on the first iteration it is determined at step 320 whether the third n-bit field is negative. If the field is not negative, then as discussed earlier, that data value will have no effect on the other data values in the composite value, and accordingly the process will proceed directly to step 340 where it is determined whether the variable X=1. If X does equal 1, then the encoding process is complete, and accordingly proceeds to step 360 where the encoding operation is terminated. However, if X does not equal 1, then the process proceeds to step 350, where X is decremented by 1, and the process then returns to step 320.

If, at step 320, it is determined that the data value in the X-th n-bit field is negative, then the process proceeds to step 330, where 1 is aligned with the X-30 1-th n-bit field and then subtracted from the register contents. Hence, considering the above example, if on the second iteration it is determined that the data value in the second n-bit field is negative, then at step 330, the logic value 1 is aligned with the least significant bit of the data value in the third n-bit field, and the subtracted from the register contents.

This process is repeated until at step 340 it is determined that X=1, at which point the sign of the data value representing the n least significant bits of the composite value will have been evaluated, and any subtraction necessary will have been performed. Then the process proceeds to step 360, where the encoding operation terminates.

Once the encoding process has been performed, then the m-bit composite value can be used in algorithms that have been designed to handle n-bit data values, and hence considering the example of the four 8-bit data values encoded into a 32-bit composite value, then a standard 8-bit algorithm using 32-bit registers can be applied to the composite value, without any special hardware being required to take account of the fact that the composite value actually encodes four smaller data values. Thus, it can be seen that the special encoding technique described above allows normal instructions to be used as if they were SIMD instructions, but without the requirement to add the special hardware that is required to handle SIMD instructions. This has been found to apply provided that the individual n-bit values that are encoded into the composite value would not have overflowed or underflowed had the algorithm been applied to them directly rather than to the composite value.

Given the above discussion, it is apparent that the encoding step can decrement the values in each but the first field by at most one because of the sign extension. Although this can underflow fields with the minimum negative value, this is not significant. For example, if a preceding 16 bit field is positive, the values −32768 . . . 32768 are represented in the current field unchanged, whereas if the proceding field is negative, −32768 is represented by +32767 in the current field, and −32767 . . . 32767 are represented in the current field as −32768 . . . 32766. So this encoding does not lose the ability to represent all possible values in each field, and performing a decoding step after an encoding step result in the original values being returned unchanged. The encoding scheme can be seen as one field 'borrowing' a '1' from the next if the value is negative. If a field changes sign from a positive to a negative value, one is borrowed from the next field, in the other direction, (and also during decoding the borrow is undone).

To provide that the encoding technique works, it will be used in the following description to encode two values into one encoded value, and then do an addition. It will illustrate that the decoded result of a single addition yields the same results as doing two separate additions on the original values. The proof easily extends to multiple values. Also, from the proof for addition it follows that multiplication by a constant, and left shifting (equivalent to multiplication by a positive power of 2) can be derived. Although the proof is not needed for proper understanding of the encoding and decoding steps, it is provided to show that the arithmetic operations applied on the encoded values do constitute useful results, making the invention useful for practical purposes.

Firstly, values A, B are defined as the result of applying the encode operation to A1, A2 and B1, B2 respectively, R is the result of an arithmetic addition operation applied on A and B, and R1, R2 are the results after decoding R.

The goal is to prove that R1=A1+B and R2=A2+B2.

A=encode(A1, A2)

B=encode(B1, B2)

R=A+B

R1,R2=decode(R)

Encoding of two signextended values in range [−N/2 . . . N/2−1 is defined as:

encode(X, Y)=X+Y*N where N is a power of 2 (log(N) being the bit width of the fields).

Decode is the reverse of encode, mathematically defined as:

decode1(Z)=SEXT(Z mod N)decode2(Z)

=SEXT((Z/N)+((Z mod N)/(N/2))) decode (Z)=decode1 (Z), decode2(Z)

The division operator, denoted as '7', specific integer division and rounds towards minus infinity.

The modulo operator, returning the remainder of a division, is denoted as 'mod'. Modulo results always have the same sign as the denominator, and range from 0 to denominator-1 (thus B*(A/B)+A mod B=A irrespective of the sign of A).

The signextension operator, sign-extending a log(N) bit value to a full width signed value in range 68 —(N/2) . . . (N/2) . . . (N/2)−1], is denoted as 'SEXT'. It is assumed SET(X mod N)=SETX(X)— that is, if X is outside the valid range before signextension, only log(N) bits of X are used of X to form a signextended value in range. It is also asserted that SETX(X)=X if X lies in the range [—(N/2) . . . (N/2)—1].

Firstly, it is proved that decode(enode()) is an identity for values within the specified range. We split this proof into three parts, one for the first encoded value, and two for the second encoded value, with a separate proof for the cases where the first value is positive or negative.

Proof for X=decode1(encode(X,Y)):

decode1(encode(X, Y))=definition of encode decode1(X+ Y*N)

=definition of decode1

SEXT((X+Y*N)mod N)

=arithmetic: (X+Y*N)mod N=X mod N SEXT(X mod N)

=arithmetic: X mod N=X(as X in [0 . . . (N/2)−1])

SEXT(X)

=SEXT definition

X

Proof for Y=decode2/(encode(X, Y)) if X positive:

decode2(encode(X, Y))=definition encode decode2(X+ Y*N)

=definition decode2

SEXT((X+Y*N)/N+(((X+Y*N)mod N)/(N/2))))

=arithmetic (X+Y*N)mod N=X mod N SEXT((X+Y*N)/ N+(((X mod N)/(N/2)))

=arithmetic: (X+Y*N)/N=Y mod N as X in [0 . . . (N/2)−1] (X does not alter Y)

SEXT(Y mod N+((X mod N)/(N/2)))

=arithmetic: X in [0 . . . (N/2)−1], so X mod N=X

SEXT(Y mod N+(X/(N/2)))

=arithmetic: X in [0 . . . (N/2)−1], so X/N=0

SEXT(Y mod N)
=SEXT definition
Y
Proof for Y=decode2(encode(X, Y) if X negative:
decode2(encode(X, Y))=definition encode decode2(X+Y*N)
=definition decode2
SEXT((X+Y*N)/n+((((X+Y*N)mod N)/(N/2)))
=arithmetic: (X+Y*N)mod N=X mod N SEXT((X+Y*N)/N+((X mod N)/(N/2)))
=arithmetic: (X+Y*N)/N=(Y−1)mod N as X in [−(N/2) . . . −1] (X borrows 1 from Y)
SEXT((Y−1)mod N+((X mod N)/(N/2))))
=arithmetic: X in [−(N/2) . . . −1], so X mod N=X+N
SEXT((Y−1)mod N+((X+N)/(N/2)))
=arithmetic: X+N in [N−(N/2) . . . N−1] and N even, so (X+N)/(N/2)=1
SEXT((Y−1)mod N+1)
=SETX definition
SEXT(((Y−1)mod N+1)mod N)
=arithmetic: (A mod N)mod N=A (double modulo is redundant) SEXT(Y mod N)
=SEXT definition
Y It can now be proved that R1=A1+A2 and R2=B1+B2 if the addition do not overflow.
R1,R2
=definition of R1,R2 decode(R)
=definition of R decode(A+B)=definitions of A and B decode(encode(A1,A2)+encode(B1,B2)
=definition of encode decode((A1+A2*N)+(B1+B2*N))
=commutativity of + and * decode((A1+B1)+(A2+B2)*N)
=definition of encode decode(enode (A1+B, A2+B2))
=decode(encode) identity if values within range
(this is the case if A1+B1 or A2+B2 do not overflow)
A1+B1, A2+B2

Algorithms that obey the above constraints can be applied without modification, and result in correct manipulation of the data values as encoded into the composite value, and accordingly all that is required once the arithmetic operation, or sequence of arithmetic operations, has been applied, is to apply a decoding operation that corrects for any effect caused by the original encoding process. The decoding technique employed in preferred embodiments of the present invention to correct for these effects that occur during encoding is illustrated with reference to FIG. 4.

At step 400, a variable X is set equal to 1. Then, at step 410, it is determined whether the data value in the X-th n-bit field is negative. Accordingly, on the first iteration, it is determined whether the first n-bit field representing the n least significant bits of the composite value is negative. If the value is negative, then the process proceeds to step 420, where the value 1 is aligned with the X+1 n-bit field, and then added to the register contents. Accordingly, as an example, if the first n-bit field is negative, then 1 is aligned with the least significant bit of the second n-bit field, and added to the register contents. The process then proceeds to step 430, where it is determined whether X=p−1. If at step 410, it was determined that the X-th n-bit field was not negative, then the process proceeds directly to the step 430, rather than via step 420.

If X does not equal p−1, then the process proceeds to step 450, where X is incremented by 1, and the process then returns to step 410. The process is then repeated until it is determined that X does equal p−1 at which point the decode process is complete, and hence proceeds to step 440 where the decode operation is terminated.

Figure 4:
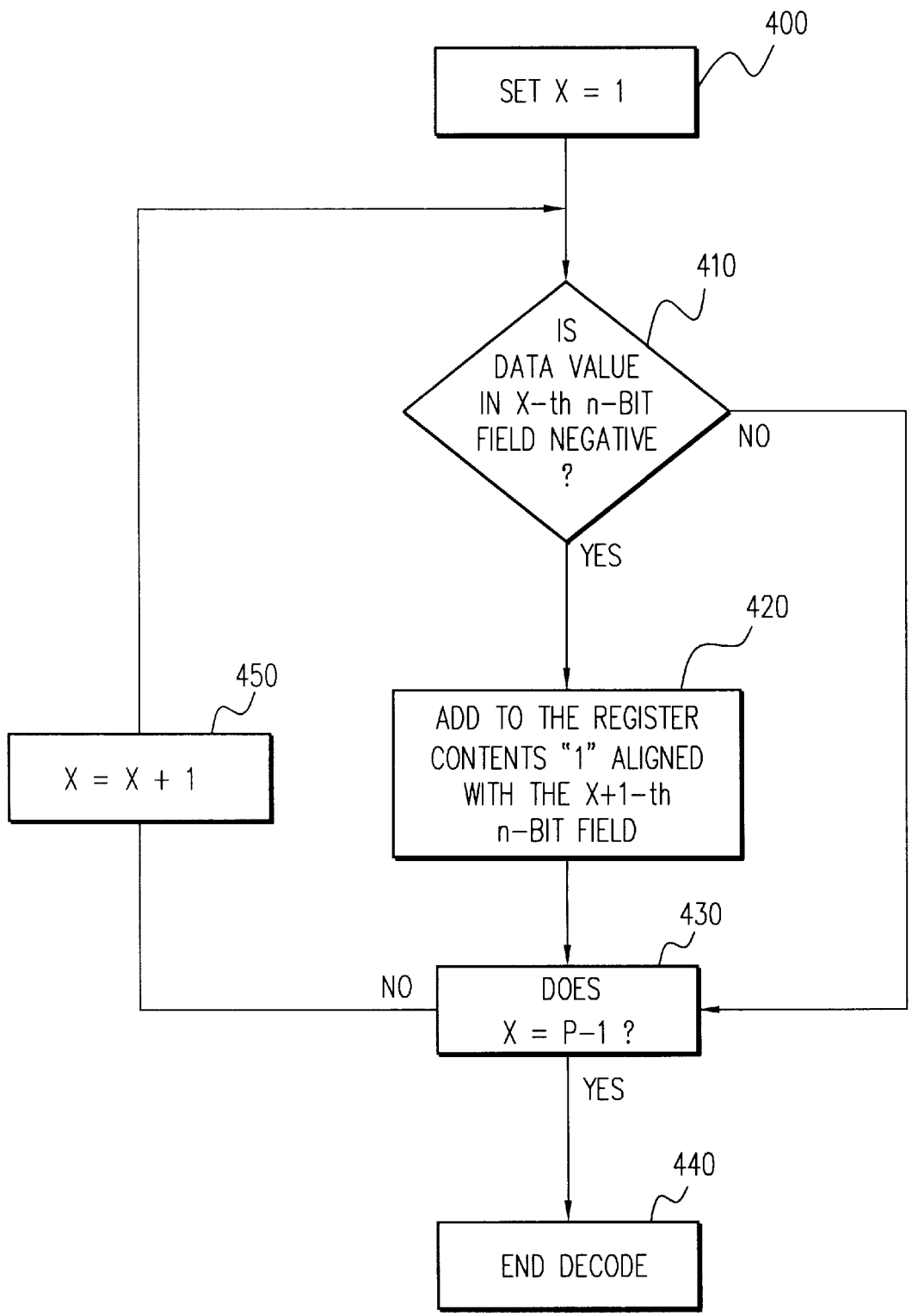
FIG. 4 is a flow diagram illustrating a decoding operation used in accordance with preferred embodiments of the present invention.

Considering the earlier example of two 16-bit values a and b being encoded into a 32-bit composite value c, then the following C code fragment can be used to produce the decoding operation illustrated in FIG. 4 (the ANSI standard rules are assumed to apply):

a=c&65545; // extract a if (a<0)c+=1<<16; // undo decrement caused be negative a b=c>>16; // extract b The value 65535 has the least significant 16 bits set to 1, and the most significant 16 bits set to 0. Hence, when an AND operation is applied based on inputs of c and 65535, the value 65535 effectively acts as a mask, such that the output is the value a. As illustrated by the second line of the above computation, if it is then determined that a is less than 0 (i.e. negative) then c is altered to equal c+(1 shifted left by 16 bits). This hence adds 1 to the least significant bit of the field of the composite value containing b. To extract b, all that is then required is to shift c right by 16 bits and to output the result, which will now be the corrected value of b.

Having discussed the encoding and decoding techniques of preferred embodiments, an example will now be discussed with reference to the following code, which demonstrates how four 8-bit signed integers can be packed into and unpacked from 32-bit integers in accordance with preferred embodiments. The example consists of adding the values in four arrays, first using the standard approach where the values in each array are added together separately, and then using an approach in accordance with preferred embodiments of the present invention.

The following C code illustrates the encoding operation employed in accordance with an embodiment of the present invention, where a 32-bit register contains four independent 8-bit values, and the register contents are manipulated to produce the encoded composite value:

```
#include<stdio.h>
// following two lines are dependent on compiler
typedef signed char int8; // this defines a type 'int8' which is a signed 8-bit number
typedef int word; // this defines a type 'word' which is a 32-bit signed integer
// encode a 32 bit containing 4 independent 8-bit values into 4 combined values
word sign_encode(word x)
{
    x-=(x<<1)&(1<<24); // if negative, subtract one
    x-=(x<<1)&(1<<16);
    x-=(x<<1)&(1<<8);
    return x;
}
```

Considering the equation x−=(x<<1)&(1<<24), the AND operation (x<<1) and (1<<24) results in the most significant bit (i.e. the sign bit) of the data value in the third n-bit field being logically ANDed with a logic value 1, which as discussed earlier will produce a 0 if the data value is positive, and a 1 if the data value is negative. Due to the shifting involved, the result will actually coincide with the least significant bit of the data value in the fourth 8-bit field, and the equation defines that x becomes x minus the result of the AND operation. Accordingly it can be seen that the result of this is to subtract from the contents of the 32-bit register the value 1 aligned with the fourth 8-bit field if the data value in the third 8-bit field is negative. It can be seen that the next two equations perform a similar subtraction but with the 1 aligned with the third and the second n-bit fields, respectively.

The following code illustrates a suitable decoding operation for converting the contents of the 32-bit register to contain the four independent result data values:

```
// decode a 32-bit word containing 4 combined 8-bit values
into 4 independent values
word sign_decode(word x)
{
    x+=(x<<1)&(1<<8); // if negative, add one
    x+=(x<<1)&(1<<16);
    x+=(x<<1)&(1<<24);
    return x;
}
```

Given the earlier discussion of the encoding process, it can be seen that the above decoding equations result in 1 being added back to the register contents to correct for any effect caused by the encoding operation.

An alternative encoding technique where four 8-bit signed values are packed into a 32 bit word is represented by the following code:

```
// pack 4 8-bit signed values into a 32-bit word
word pack(int8 a, int8 b, int8 c, int8 d)
{
    return (word) a+((word)b<<8)+((word)c<<16)+((word)d<<24);
}
```

In accordance with the above equation, the values a, b, c and d are first sign extended to be a word (i.e. 32 bits) in length, the value b is then shifted left by 8 bits, the value c is shifted left by 16 bits and the value d is shifted left by 24 bits, and then the packed word is formed by adding the sign extended and shifted values together.

A suitable decoding operation which yields four separate result data values is illustrated by the following code:

```
// unpack a 32-bit work into 4 8-bit signed values
void unpack(word x, int8*a, int8*b, int8*c, int8*d)
{
    x=sign_decode(x);
    *a=x;
    *b=x>>8;
    *c=x>>16;
    *d=x>>24;
}
```

In accordance with the above equations, the 32 bit word is first decoded by applying a decoding operation in accordance with preferred embodiments of the present invention, and then the word is right-shifted so as to align the i-th 8-bit field with the low 8 bits before storing this value in a storage location pointed to by pointers a, b, c and d, respectively.

The following code is an example of an addition of multiple values using both the above mentioned standard approach, and the approach of preferred embodiments of the present invention:

```
#define SIZE 8 // this defines that each array contains 8 values
int8 A[SIZE], B[SIZE], C[SIZE], D[SIZE]; // this defines that arrays A, B, C & D contain 8-bit integers
word E [SIZE]; // this defines that array E contains words (i.e. 32-bits)
int8 serial_sum8(int8*p) // this defines a serial sum operation for 8-bit integers
{
    return p[0]+p[1]+p[2]+p[3]+p[4]+p[5]+p[6]+p[7];
}
word parallel_sum8(word*p) // this defines a parallel sum operation for 32-bit words
{
    return p[0]+p[1]+p[2]+p[3]+p[4]+p[5]+p[6]+p[7];
}
int main(void) // program starts
{
    int i; // a variable "i" is defined
    int8 resa, resb, resc, resd; // this defines that results resa, resb, resc, resd are 8-bit integers
    word res; // this defines that the result "res" is a 32-bit word
    // Initialize A, B, C and D
    for (i=0; i<SIZE; i++) // loop is defined for i=0 to SIZE in order to generate arbitrary contents for arrays A, B, C and D for the sake of illustration
    {
        A[i]=i-10;
        B[i]=-i*3+10;
        C[i]=i+5;
        D[i]=i*i-5*i+1;
    }
    // standard approach
    resa=serial_sum8(A);
    resb=serial_sum8(B);
    resc=serial_sum8(C);
    resd=serial_sum8(D);
    printf("Results 1: %d %d %d %d\n", resa, resb, resc, resd);
    // approach of preferred embodiments
    for (i=0; i<SIZE; i++)
        E[i]=pack(A[i], B[i], C[i], D[i]); // pack data first using encoding technique of present invention
    res=parallel_sum8(E);
    unpack(res, &resa, &resb, &resc, &resd);
    printf("Results 2: %d %d %d %d\n", resa, resb, resc, resd);
    return 1;
}
```

If the above two pieces of code are run, the results printed for the standard approach and for the preferred embodiment approach are the same. However, the standard approaches needs 28 additions, while the approach of preferred embodiments needs only 7 additions. However, packing and unpacking adds approximately 100 operations, so the best gains are achieved when the processing phase is quite complex. In a 8×8 DCT, significant gains are achieved since about 450 additions are needed per 64 data values.

Given the above description, it is clear that preferred embodiments of the present invention allow non-SIMD instructions (i.e. standard instructions) to be used on composite values, and for the result to then be decoded to produce a set of results equivalent to the application of the algorithm to each of the constituent data values individually. This results in significant processing speed improvements. One particular field in which this technique has been found to be particularly beneficial is the field of JPEG or MPEG compression and decompression, where many DCT operations need to be performed, each DCT operation consisting of a series of additions and multiplications performed on signed data. For example, a typical DCT may be performed on 8-bit signed data, resulting in 16-bit outputs. By scaling the intermediate results appropriately, it is possible to calculate a DCT accurately while using 16-bit signed integers. By employing the technique of preferred embodiments of the present invention, two 16-bit DCT calculations can be performed in parallel on a 32-bit processor using a standard 32-bit arithmetic instruction. A pre-processing step is performed to encode the data used for two DCTs into one composite value, after which the normal DCT algorithm is applied without change. The result is then decoded into the two DCT results. Since encoding and decoding are particularly efficient operations (using an ARM processor core, one instruction is required for encoding (ADD C,A,B,LSL#16) and three instructions for decoding (MOVS B,C,ASR#16, ADC B,B,#0, followed by SUB-A,C,B,LSL#16)), and indeed in JPEG packing can be done for free, it has been found that DCT calculation becomes nearly twice as fast.

Although a particular embodiment has been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

What is claimed is:

1. A method of operating a data processing system to perform an arithmetic operation on p signed n-bit data values in 2-s complement form, wherein p and n are positive integers, said method comprising the steps of:
    encoding the p signed n-bit data values as a composite value, said composite value comprising p n-bit fields, by an encoding operation equivalent to aligning each signed data value with a respective n-bit field, sign extending each signed data value to the most significant bit of the composite value, and adding the aligned and sign extended data values to form the composite value;
    applying the arithmetic operation to the composite value to produce an encoded result comprising p n-bit fields; and
    decoding the encoded result to produce p final results by applying a decoding operation equivalent to extracting the data from each n-bit field of the encoded result and correcting for any effect caused by the addition of an adjacent sign extended data value by the encoding operation;
    whereby each final result represents the application of the arithmetic operation to a corresponding signed n-bit data value, provided that each signed data value encoded into composite value would not have overflowed or underflowed had the arithmetic operation been applied to them directly.

2. A method of operating a data processing system to perform an arithmetic operation on p signed n-bit data values in 2-s complement form, wherein p and n are positive integers, said method comprising the steps of:
    encoding the p signed n-bit data values as a composite value, said composite value comprising p n-bit fields, by an encoding operation equivalent to aligning each signed data value with a respective n-bit field, sign extending each signed data value to the most significant bit of the composite value, and adding the aligned and sign extended data values to form the composite value;
    applying the arithmetic operation to the composite value to produce an encoded result comprising p n-bit fields; and
    decoding the encoded result to produce p final results by applying a decoding operation equivalent to extracting the data from each n-bit field of the encoded result and correcting for any effect caused by the addition of an adjacent sign extended data value by the encoding operation; whereby each final result represents the application of the arithmetic operation to a corresponding signed n-bit data value, provided that each signed data value encoded into composite value would not have overflowed or underflowed had the arithmetic operation been applied to them directly, wherein the encoding operation comprises the steps of:
    allocating said p n-bit data values to respective n-bit fields of an intermediate value, where a first n-bit field comprises the n lowest significant bits of the intermediate value and a $p^{th}$ n-bit field comprises the n highest significant bits of the intermediate value;
    for a $(p-1)^{th}$ to the first n-bit field, beginning with the $(p-1)^{th}$ n-bit field, determining whether the data in that n-bit field is negative, and if so, generating a new intermediate value by subtracting from the intermediate value a logic 1 value aligned with the adjacent n-bit field representing n higher significant bits;
    such that such the first n-bit field has been processed, said intermediate value is said composite value.

3. A method of operating a data processing system to perform an arithmetic operation on p signed n-bit data values in 2-s complement form, wherein p and n are positive integers, said method comprising the steps of:
    encoding the p signed n-bit data values as a composite value, said composite value comprising p n-bit fields, by an encoding operation equivalent to aligning each signed data value with a respective n-bit field, sign extending each signed data value to the most significant bit of the composite value, and adding the aligned and sign extended data values to form the composite value;
    applying the arithmetic operation to the composite value to produce an encoded result comprising p n-bit fields; and
    decoding the encoded result to produce p final results by applying a decoding operation equivalent to extracting the data from each n-bit field of the encoded result and correcting for any effect caused by the addition of an adjacent sign extended data value by the encoding operation; whereby each final result represents the application of the arithmetic operation to a corresponding signed n-bit data value, provided that each signed data value encoded into composite value would not have overflowed or underflowed had the arithmetic operation been applied to them directly, wherein a first n-bit field of the encoded result comprises the n lowest significant bits of the encoded result and a $p^{th}$ n-bit field of the encoded result comprises the n highest significant bits of the encoded result, the decoding operation comprising the steps of:
    for the first n-bit field to a $(p-1)^{th}$ n-bit field, starting with the first n-bit field, determining if the data in that n-bit field is negative, and if so, generating a new encoded result by adding to the encoded result a logic 1 value aligned with the adjacent n-bit field representing n higher significant bits;
    such that when the $(p-1)^{th}$ n-bit field has been processed, each n-bit field contains one of said p final results.

4. A method as claimed in claim 1, wherein the arithmetic operation is a function of one or more composite values, each composite value encoding a plurality of signed n-bit data values, and each composite value being generated by applying said encoding step to the corresponding plurality of signed n-bit data values.

5. A method as claimed in claim 1, wherein said arithmetic operation comprises a plurality of operations.

6. A method as claimed in claim 1, wherein the arithmetic operation comprises one or more discrete cosine transformation (DCT) operations, each DCT operation being a function of one or more composite values, each composite value encoding a plurality of signed n-bit data values, and each composite value being generated by applying said encoding step to the corresponding plurality of signed n-bit data values.

7. A method as claimed in claim 6, wherein the one or more DCT operations are applied to perform Joint Photographic Expert Group (JPEG) or Moving Pictures Expert Group (MPEG) compression or decompression.

8. A data processing system for performing an arithmetic operation on p signed n-bit data values in 2–s complement format, wherein p and n are positive integers, said system comprising:

a processor for applying the arithmetic operation;

a storage for storing the p signed n-bit data values;

the processor being arranged, prior to execution of the arithmetic operation, to retrieve the p signed n-bit data values from the storage, and to encode the p signed n-bit data values as a composite value comprising p n-bit fields by an encoding operation equivalent to aligning each signed data value with a respective n-bit field, sign extending each signed data value to the most significant bit of composite value, and adding the aligned and sign extended data values to form the composite value, the composite value being stored in the storage;

the processor being arranged to apply the arithmetic operation to the composite value to produce an encoded result comprising p n-bit fields, and to store the encoded result in the storage; and the processor further being arranged, subsequent to application of the arithmetic operation, to decode the encoded result to produce p final results by executing a decoding operation equivalent to extracting the data from each n-bit field of the encoded result and correcting for any effect caused by the addition of an adjacent sign extended data value by the encoding operation;

whereby each final result represents the application of the arithmetic operation to a corresponding signed n-bit data value provided that each signed data value encoded into the composite value would not have overflowed or underflowed had the arithmetic operation been applied to them directly.

9. A data processing system as claimed in claim 8, wherein the processor includes a shifter and an arithmetic logic unit (ALU) arranged to execute the encoding and decoding operations.

10. A data processing system as claimed in claim 8, wherein the storage is a register bank for storing data values used by the processor.

11. A data processing system for performing an arithmetic operation on p signed n-bit data values in 2–s complement format, wherein p and n are positive integers, said system comprising:

a processor for applying the arithmetic operation;

a storage for storing the p signed n-bit data values;

the processor being arranged, prior to execution of the arithmetic operation, to retrieve the p signed n-bit data values from the storage, and to encode the p signed n-bit data values as a composite value comprising p n-bit fields by an encoding operation equivalent to aligning each signed data value with a respective n-bit field, sign extending each signed data value to the most significant bit of composite value, and adding the aligned and sign extended data values to form the composite value, the composite value being stored in the storage;

the processor being arranged to apply the arithmetic operation to the composite value to produce an encoded result comprising p n-bit fields, and to store the encoded result in the storage; and the processor further being arranged, subsequent to application of the arithmetic operation, to decode the encoded result to produce p final results by executing a decoding operation equivalent to extracting the data from each n-bit field of the encoded result and correcting for any effect caused by the addition of an adjacent sign extended data value by the encoding operation;

whereby each final result represents the application of the arithmetic operation to a corresponding signed n-bit data value provided that each signed data value encoded into the composite value would not have overflowed or underflowed had the arithmetic operation been applied to them directly, wherein the encoding operation is arranged to allocate said p n-bit data values to respective n-bit fields of an intermediate value, where a first n-bit field comprises the n lowest significant bits of the intermediate value and a $p^{th}$ n-bit field comprises the n highest significant bits of the intermediate value, and further is arranged, for a $(p-1)^{th}$ to the first n-bit field, beginning with the $(p-1)^{th}$ n-bit field, to determine whether the data value in that n-bit field is negative, and if so, to generate a new intermediate value by subtracting from the intermediate value a logic 1 value aligned with the adjacent n-bit field representing n higher significant bits, such that when the first n-bit field has been processed, said intermediate value is said composite value.

12. A data processing system for performing an arithmetic operation on p signed n-bit data values in 2–s complement format, wherein p and n are positive integers, said system comprising:

a processor for applying the arithmetic operation;

a storage for storing the p signed n-bit data values;

the processor being arranged, prior to execution of the arithmetic operation, to retrieve the p signed n-bit data values from the storage, and to encode the p signed n-bit data values as a composite value comprising p n-bit fields by an encoding operation equivalent to aligning each signed data value with a respective n-bit field, sign extending each signed data value to the most significant bit of composite value, and adding the aligned and sign extended data values to form the composite value, the composite value being stored in the storage;

the processor being arranged to apply the arithmetic operation to the composite value to produce an encoded result comprising p n-bit fields, and to store the encoded result in the storage; and the processor further being arranged, subsequent to application of the arithmetic operation, to decode the encoded result to produce p final results by executing a decoding operation equivalent to extracting the data from each n-bit field of the encoded result and correcting for any effect caused by the addition of an adjacent sign extended data value by the encoding operation; whereby each final result represents the application of the arithmetic operation to a corresponding signed n-bit data value provided that each signed data value encoded into the composite value would not have overflowed or underflowed had the arithmetic operation been applied to them directly, wherein a first n-bit field of the encoded result comprises the n lowest significant bits of the encoded result and a $p^{th}$ n-bit field of the encoded result comprises the n highest significant bits of the encoded result, and the decoding operation is arranged, for a first n-bit field to a $(p-1)^{th}$ n-bit field, starting with the first n-bit field, to determine if the data in that n-bit field is negative, and if so, to generate a new encoded result by adding to the encoded result a logic 1 value aligned with the adjacent n-bit field representing n higher significant bits, such that when the $(p-1)^{th}$ n-bit field has been processed, each n-bit field contains one of said p final results.

13. A data processing system as claimed in claim 8, wherein the arithmetic operation is a function of one or more composite values, each composite value encoding a plurality of signed n-bit data values, and each composite value being generated by applying said encoding operation to the corresponding plurality of signed n-bit data values.

14. A data processing system as claimed in claim 8, wherein said arithmetic operation comprises a plurality of operations.

15. A data processing system as claimed in claim 8, wherein the arithmetic operation comprises one or more discrete cosine transformation (DCT) operations, each DCT operation being a function of one or more composite values, each composite value encoding a plurality of signed n-bit data values, and each composite value being generated by applying said encoding step to the corresponding plurality of signed n-bit data values.

16. An encoding/decoding manager for a data processing system arranged to perform an arithmetic operation on p signed n-bit data values in 2-s complement format, wherein p and n are positive integers, the encoding/decoding manager being arranged to encode the p signed 'n-bit' data values as a composite value prior to application of the arithmetic operation by the data processing system to generate an encoded result, and to subsequently decode the encoded result to produce p final results, the encoding/decoding manager comprising:

an encoder configured in operation to encode the p signed n-bit data values as said composite value comprising p n-bit fields by an encoding operation equivalent to aligning each signed data value with a respective n-bit field, sign extending each signed data value to the most significant bit of the composite value, and adding the aligned and sign extended data values to form the composite value; and a decoder configured in operation to produce said p final results by applying a decoding operation equivalent to extracting the data from each n-bit field of the encoded result and correcting for any effect caused by the addition of an adjacent sign extended data value by the encoding operation;

whereby each final result represents the application of the arithmetic operation to a corresponding signed n-bit data value provided that each signed data value encoded into the composite value would not have overflowed or underflowed had the arithmetic operation been applied to them directly.

17. A computer program on a computer readable memory for operating a data processing system to encode p signed n-bit data values, wherein p and n are positive integers, in 2-s complement format as a composite value prior to application of an arithmetic operation to generate an encoded result, and to subsequently decode the encoded result to produce p final results, the computer program comprising:

an encoder configured in operation to encode the p signed n-bit data values as said composite value comprising p n-bit fields by an encoding operation equivalent to aligning each signed data value with a respective n-bit field, sign extending each signed data value to the most significant bit of the composite value, and adding the aligned and sign extended data values to form the composite value; and a decoder configured in operation to produce said p final results by applying a decoding operation equivalent to extracting the data from each n-bit field of the encoded result and correcting for any effect caused by the addition of an adjacent sign extended data value by the encoding operation, whereby each final result represents the application of the arithmetic operation to a corresponding signed n-bit data value, provided that each signed data value encoded into the composite value would not have overflowed or underflowed had the arithmetic operation been applied to them directly.

\* \* \* \* \*